United States Patent [19]

Segrave et al.

[11] Patent Number: 5,529,702
[45] Date of Patent: Jun. 25, 1996

[54] METHOD FOR REMOVING OIL FROM A PARTS CLEANING TANK AND THE CLEANING SOLUTION THEREIN

[75] Inventors: Thomas J. Segrave, Greenville; William D. White, Macclesfield, both of N.C.

[73] Assignee: American Coating Technologies Inc., Greenville, N.C.

[21] Appl. No.: 225,799

[22] Filed: Apr. 11, 1994

[51] Int. Cl.⁶ .............................. B01D 17/12; C02F 1/00; C02F 9/00
[52] U.S. Cl. ...................... 210/805; 210/806; 210/195.1; 210/187; 134/10
[58] Field of Search ................................. 134/10, 42, 40, 134/109; 210/195.1, 201, 167, 177, 187, 805, 806

[56] References Cited

U.S. PATENT DOCUMENTS

| | | | |
|---|---|---|---|
| 1,612,557 | 12/1926 | Weisgerber | 210/187 |
| 1,702,612 | 2/1929 | Morse | 210/187 |
| 3,054,602 | 9/1962 | Proudman | 210/201 |
| 3,364,893 | 1/1968 | Maddock | 134/10 |
| 3,450,086 | 6/1969 | Maddock | 134/10 |
| 3,749,246 | 7/1973 | Hargraves | 210/201 |
| 4,048,063 | 9/1977 | Cheng | 210/187 |

Primary Examiner—Jill Warden
Assistant Examiner—Saeed Chaudhry
Attorney, Agent, or Firm—Rhodes, Coats & Bennett

[57] ABSTRACT

The present invention entails a method and a system for continuously removing oil from the cleaning solution being utilized in a tank for cleaning parts and particularly removing oil from parts prior to an electrocoating operation. Oil containing cleaning solution is pumped to a smaller oil removing tank where the cleaning solution is subjected to a cooling operation. Once the cleaning solution within the oil removing tank is cooled to a certain level, the oil bonded with the surfactant portion of the cleaning solution is separated and removed through a gravity removal process. This process is continuous as the cleaning solution from the parts cleaning tank is continuously circulated through the oil removing tank where oil is effectively stripped or removed from the cleaning solution before it is returned back to the parts cleaning tank.

11 Claims, 1 Drawing Sheet

5,529,702

METHOD FOR REMOVING OIL FROM A PARTS CLEANING TANK AND THE CLEANING SOLUTION THEREIN

FIELD OF THE INVENTION

The present invention relates to coating processes and more particularly to a process for continuously removing oil from a cleaning solution utilized to clean oil from metal parts prior to the metal parts being subjected to a particular coating process.

BACKGROUND OF THE INVENTION

In an electrocoating process it is essential that metal parts be clean prior to the parts being subjected to electrocoating. Typically, metal parts, such as automobile parts, etc., that are to be electrocoated reach the coating facility with varying degrees of oil on them. These oily parts are placed in a cleaning tank having cleaning solution heated to approximately 120°–180° F. Oil is removed from the parts during this cleaning process. Typically, these cleaning solutions include a surfactant that bonds with the oil and basically prevents removed oil from being redeposited on the parts. However, over time, the surfactant portion of the cleaning solution becomes saturated with oil and is no longer effective in isolating the removed oil from the parts being cleaned. Thus, the cleaning solution is no longer effective to clean the parts.

In the past, the cleaning solution, once saturated with oil, has been rejuvenated in a number of ways. First, it has been standard practice in some operations to shut down the cleaning phase entirely, cool the cleaning solution, and attempt to remove oil off the top of the cleaning solution within the cleaning tank. This is obviously expensive because the cleaning process is interrupted and to that extent the entire electrocoating or coating process is halted.

To avoid costly down time, some electrocoating processors have attempted to continuously drain cleaning solution from the cleaning tank while at the same time replenishing the cleaning tank with fresh or new cleaning solution. This is extremely expensive because it continuously requires that new or fresh cleaning solution be placed in the cleaning tank. It is virtually impossible to incorporate an optimum control in a continuous drain operation. Therefore, it is not uncommon in a continuous drain operation to waste cleaning solution. Also, in a continuous drain approach, one will find that the concentration of the cleaning solution will continue to fluctuate and the fluctuation can be substantial. This can greatly influence the cleaning efficiency of the total operation and often there will be insufficient cleaning solution within the tank and consequently it takes longer to clean the parts or in some cases the parts removed from the tank will not be clean but still have deposits of oil and debris on them.

Also, in prior art processes that involve cleaning oil from metal parts, the entire parts cleaning tank has to be drained periodically. In some processes, for example, the entire cleaning tank and its cleaning solution has to be drained as often as every forty-eight hours. Sometimes this process can consume eight hours and it obviously follows that the cleaning operation performed by the tank has to be completely shut down for the entire period.

Therefore, there is and continues to be a need for an efficient process that will continually remove oil from a parts cleaning solution and which will accomplish that objective without requiring the cleaning process to be shut down and which will provide an economical approach for maintaining and controlling the cost of the cleaning solution.

SUMMARY AND OBJECTS OF THE INVENTION

The present invention entails a continuous process for removing oil from the cleaning solution within a parts cleaning process that forms a part of an overall electrocoating process. The process of the present invention entails continuously pumping a portion of the cleaning solution from the parts cleaning tank to an oil removing tank. At the oil removing tank, the temperature of the cleaning solution passing therethrough is substantially reduced such that oil bound with surfactants is released such that it can be efficiently removed from the cleaning solution through a gravity process. After oil has been removed from the cleaning composition, the cleaning composition is simply recirculated back to the parts cleaning tank.

It is therefore an object of the present invention to provide a continuous process for removing oil from a cleaning solution utilized to remove oil from metal parts which permits the cleaning process to operate continuously without shutdowns or interruptions and which conserves and makes efficient use of the cleaning solution.

Another object of the present invention is to provide an oil removing process for a metal cleaning operation that avoids the requirement or necessity for completely draining the parts cleaning tank at short time intervals.

Another object of the present invention resides in the provision of an oil removing process of the character referred to above that maintains a generally constant cleaning solution concentration within the parts cleaning tank over a period of time, thereby yielding an efficient and effective cleaning operation that removes oil from metal parts prior to an electrocoating operation.

Another object of the present invention resides in the provision of a process and a system for removing oil from a parts cleaning solution that is effective to reduce the overall quantity of cleaning solution required over a period of time.

Other objects and advantages of the present invention will become apparent and obvious from a study of the following description and the accompanying drawings which are merely illustrative of such invention.

DETAILED DESCRIPTION OF THE INVENTION

Figure 1:
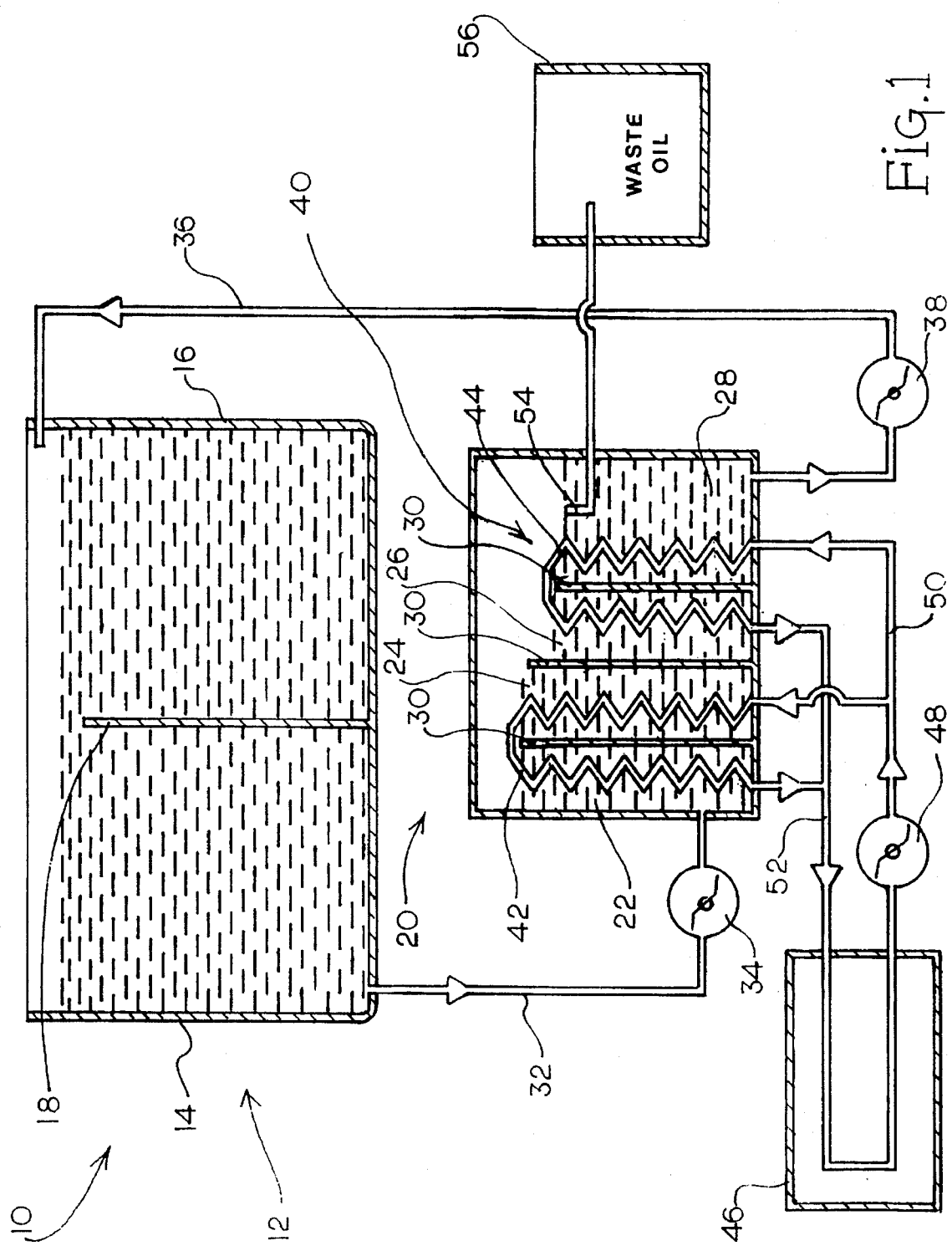
FIG. 1 is schematic illustration of the process and system for removing oil from a cleaning solution utilized to clean oil from metal parts prior to an electrocoating operation.

With further reference to the drawing, FIG. 1, the system and method for removing oil from a parts cleaning solution is generally illustrated therein. Before discussing the details of the method or process, a general description of the structure and system of the present invention will be discussed. In this regard, the oil recovery system of the present invention is shown therein and indicated generally by the numeral 10. A parts cleaning tank indicated generally by the numeral 12 is shown in the drawing. Tank 12 includes two compartments or chambers 14 and 16 which are separated by an intermediate wall 18. It is common practice in electrocoating metal parts to subject the parts to a rigorous cleaning process prior to electrocoating. This is conventionally accomplished by providing a relatively large tank filled with a cleaning solution and maintaining the cleaning solution at a temperature of at least approximately 120°–180° F. Prior to coating, the mechanical parts are placed in the cleaning chamber 12 for a selected time period. While in the cleaning chambers 12 and 16 the parts are cleaned of dirt, debris and most importantly oil and grease residue. It is appreciated that many metal parts during fabrication, milling or during casting are subject to oil and oil tends to accumulate on these metal parts and it is absolutely essential that the oil be removed from the metal parts prior to electrocoating.

Typically, the cleaning solution selected by the electrocoating processor will include conventional surfactants that tend to bond or combine with oil removed from the metal parts and effectively isolate the oil in such a fashion that the oil will not become redeposited or reattached to the metal parts. However, to maintain the cleaning solution at an effective strength level it is important to periodically provide fresh cleaning solution for the chamber 12 or to remove oil from the cleaning solution.

The present invention provides a system and a process for continuously removing oil from the cleaning solution contained in the parts cleaning tank 12. This is accomplished by providing an oil removing tank indicated generally by the numeral 20 and continuously circulating a portion of the cleaning solution found in the cleaning tank 12 through the oil removing tank and removing oil from the cleaning solution and then recirculating the clean or purified cleaning solution back to the parts cleaning tank 12.

Viewing the oil removing tank 20 in more detail, it is seen that the same includes a series of compartments, with the compartments being closed and isolated from each other and arranged such that as the cleaning solution is pumped through the oil removing tank 20 that the cleaning solution passes through the respective compartments of the oil removing tank. In the embodiment illustrated herein, the oil removing tank 20 includes four compartments referred to as an initial compartment 22, two intermediate compartments 24 and 26, and a final compartment 28. Respective compartments 22–28 are divided and separated by a series of partitions. As seen in the drawings, the respective partition walls 30 include an upper terminal edge. As will be appreciated from subsequent portions of this disclosure, a cleaning solution pumped from the tank 12 into the oil removing tank 20 will sequentially move from the initial compartment 22, through the intermediate compartments 24 and 26 and into the final compartment 28. As the cleaning solution moves from the initial compartment 22 to the final compartment 30 it is seen that the solution essentially overflows the upper terminal edges of the partition walls 30 since the upper terminal edges of the partition walls 30 are stepped down from the initial compartment 22 to the final compartment 28.

In order to continuously circulate cleaning solution from the parts cleaning tank 12, there is provided an inlet line 32 that extends from compartment 14 to the initial compartment 22 of the oil removing tank 20. Operatively connected in the inlet line 32 is a variable flow pump 34. Pump 34 is of a conventional design and it is appreciated can be of various ratings. For the type of application disclosed herein, it is contemplated that a twelve-gallon per minute variable flow pump is appropriate. Extending from the final compartment 28 of the oil removing tank 20 is an outlet or return line 36 that is plumbed into the second compartment 16 that forms a part of the overall parts cleaning tank 12. Operatively connected in line 36 is a second variable flow pump 38.

The process of the present invention entails cooling the cleaning solution passing through the oil removing tank 20. To accomplish this there is provided a cooling coil network 40 disposed generally uniformly throughout the various compartments of the oil removing tank 20. Cooling coil network 40 in the preferred embodiment illustrated herein, includes two cooling coil units 42 and 44. Note that the first cooling coil unit 42 is disposed in the first two compartments, that is compartments 22 and 24 of the oil removing tank 20. Note in FIG. 1 where the first cooling coil unit 42 extends through the initial compartment 22, over the upper terminal edge of the adjacent partition wall 30 and downwardly into and through the first intermediate compartment 24. The second cooling coil unit 44 extends through the second intermediate compartment 26, up over the terminal edge of the adjacent downstream partition wall 30, and downwardly through the final compartment 28. Cooling coil units 42 and 44 are operatively connected to a conventional chiller or refrigeration unit 46. The chiller 46 functions to cool a cooling fluid which is continuously pumped through the cooling coil network 40 so as to cool the cleaning solution being pumped and moved through the oil removing tank 20. There is provided a cooling solution transfer line between the chiller 46 and the cooling coil network 40. In this regard, there is provided an inlet line 50 that includes a variable flow pump 48, and a return line 52. Cooling fluid is pumped from the chiller or refrigeration unit 46 through the inlet line 50 into both the cooling coil units 42 and 44. Return cooling fluid passes from the respective cooling coil units 42 and 44 to the return line 52 and back to the chiller or refrigeration unit 46.

To remove oil from the cleaning solution within the oil removing tank 20, there is provided an oil remover 54 which is communicatively connected with an oil collector 56.

The process of the present invention entails continuously removing oil and oil traces from the cleaning solution utilized in the cleaning tank 12. In an associated electrocoating process metal parts having oil deposits thereon are placed in the cleaning tank 12 for the purpose of removing oil therefrom. The cleaning solution found in the respective compartments or tanks 14 and 16 is pumped directly into the oil removing tank 12 by pump 34. In the embodiment illustrated herein, individual compartments 14 and 16 of the large tank 12 have a capacity of 1,000 gallons per compartment or 2,000 gallons overall. The solution is pumped at a rate of approximately 8 gallons per minute into the oil removing tank 20. It should be appreciated that the cleaning solution within tank 12 is maintained at a temperature of approximately 165° F. Once the cleaning solution reaches the oil removing tank 20, the temperature of the entire volume of cleaning solution within the oil removing tank is reduced to a temperature of approximately 80° to 115° F. The oil removing tank 20 of the preferred embodiment has a capacity of approximately 300 gallons. In order to reduce the temperature of the cleaning solution within the oil removing tank 20 to a range of 108° to 110° F., it has been found that the temperature of the cooling solution leaving the chiller 46 should be maintained at approximately 55° to 60° F. It is appreciated that the temperature of the cooling solution will vary depending on the application. Basically, the cooling solution must function to cool the cleaning solution within the oil removing tank sufficient to separate the oil from the cleaning solution.

By cooling the cleaning solution and reducing its temperature from approximately 165° F. to approximately 108° to 110° F., the oil removed from the metal part and formerly bound with the surfactant portion of the cleaning solution, now becomes separated from the surfactant portion of the cleaning solution. The temperature reduction causes the oil to become separated from the cleaning solution. Once the oil is effectively released by the surfactants it then follows that the oil will move to the top of the oil removing tank and can be skimmed from the top of the final compartment 28 by the oil remover 54. Essentially, the oil remover 54 includes an oil inlet that is disposed at or just below the liquid level in the final compartment 28. Oil disposed on the surface of the cleaning solution that is found in the final compartment 28 is directed through the oil remover conduit 54 into the waste oil collector 56 or drain. It is appreciated that as the cleaning solution moves from the initial compartment 22, through the intermediate compartments 24 and 26, and to the final compartment 28 that the concentration of oil on the surface of the solution will gradually increase to a maximum at the final compartment 28.

In the preferred embodiment illustrated herein, the flow of cleaning solution from the parts cleaning tank 12 to the oil removing tank 20 would be approximately 8 gallons per minute. Because oil is continuously removed from the cleaning solution in the oil removing tank 20, it is appreciated that the return flow from the final compartment 28 back to the tank 12 should be slightly less than the flow from the tank 12 to the initial compartment 22. Therefore, in a preferred embodiment, the flow of cleaning solution through return line 36 would be approximately 7.5 gallons per minute. This would allow a rate of oil removal of approximately 0.5 gallons per minute.

From the foregoing specification and discussion, it is appreciated that the present invention entails an effective and efficient process for removing oil from the cleaning solution utilized to clean and remove oil from metal parts prior to the electrocoating process. Because the oil removing process is continuous, the parts cleaning phase of the total process does not have to be interrupted for daily or weekly cleaning or draining. Instead of having to drain the parts cleaning tank 12 every forty-eight hours which is required for some conventional oil removing processes, the present sidestream oil removing process in some applications enables the oil cleaning tank 12 to be continuously used twenty-four hours a day for a period of up to three months before there is a requirement that the tank be completely drained.

With the process of the present invention, cleaning solution and particularly the surfactants contained therein are conserved and not wasted as is the case in some conventional oil removing processes. Also, the concentration of the cleaning solution within the tank 12 is maintained generally constant and consequently cleaning efficiency is optimized within the tank 12. Because of this, the cleaning solution within the respective compartments 14 and 16 is maintained in a fresh and efficient state and is not saturated with oil. Consequently, the purified cleaning solution is effective to remove substantially all oil, dirt and debris from the metal parts being cleaned within the cleaning tank 12 and thereby provides an optimum metal surface for the electrocoating process that follows.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of continuously removing oil from a large metal parts cleaning tank and a cleaning solution contained therein comprising the steps of:
    a) maintaining the temperature of the cleaning solution in the large metal parts cleaning tank at a temperature of approximately 120°–180° F.;
    b) continuously pumping the cleaning solution from the larger metal parts cleaning tank to a multi-compartment small oil removing tank having a series of separated and staged compartments including an initial compartment and a final compartment;
    c) pumping the cleaning solution through the series of staged compartments starting with the initial compartment and continuing to the final compartment by overflowing the cleaning solution from one compartment to another;
    d) extending a cooling coil network through the compartments of the small oil removing tank;
    e) chilling a cooling solution and continuously pumping the cooling solution through the cooling coil network disposed in the compartments of the small oil removing tank;
    f) cooling the cleaning solution uniformly throughout the series of staged compartments while the cleaning solution is continuously passing through the small oil removing tank and reducing the temperature of the cleaning solution to a temperature of approximately 80°–120° F. so as to separate the oil contained within the cleaning solution so as to allow free oil to rise to the tops of the series of compartments of the small oil removing tank;
    g) removing freed oil from the top of the cleaning solution in the final compartment of the small oil removing tank; and
    h) pumping the cleaning solution from the final compartment of the small oil removing tank back to the metal parts cleaning tank.

2. The method of claim 1 including a step of maintaining the cooling solution being continuously pumped and circulated through the series of stage compartments of the small oil removing tank at a temperature of approximately 50°–65° F.

3. The method of claim 1 wherein the small oil removing tank includes at least four separated stage compartments separated by spaced apart walls having upper terminal edges that step down from the initial compartment to the final compartment and wherein process includes sequentially overflowing the compartments from the initial compartment to the final compartment such that the cleaning solution flows over the upper terminal edge of separating walls as the cleaning solution is transferred from the initial compartment to the final compartment.

4. The method of claim 1 including cycling substantially all the cleaning solution in the large metal parts cleaning tank through the small oil removing tank at least every 8 hours.

5. A method of continuously removing oil from a large parts cleaning tank and a cleaning solution therein comprising the steps of:
    a) continuously pumping the cleaning solution from the large parts cleaning tank to a small oil removing tank;
    b) continuously cooling the cleaning solution within the oil removing tank so as to substantially reduce the temperature of the cleaning solution within the oil removing tank compared to the high temperature of the cleaning solution maintained in the parts cleaning tank;

c) the cooling resulting in oil being separated from surfactant portion of the cleaning solution while the cleaning solution is being pumped through the oil removing tank;

d) transferring separated oil from the oil removing tank;

e) recirculating the cleaning solution from the oil removing tank back to the large parts cleaning tank; and f) continuing above process so as to continuously clean and remove oil from the cleaning solution utilized in the large parts cleaning tank.

6. The method of claim 5 including a step of transferring the cleaning solution sequentially through a series of separate compartments formed in the oil removing tank.

7. The method of claim 6 including a step of overflowing the cleaning solution from one compartment to an adjacent compartment as the cleaning solution is pumped and moved through the oil removing tank.

8. The method of claim 7 wherein between the compartments of the oil removing tank there is provided a separating wall having an upper terminal edge and wherein the oil removing tank includes at least three separate compartments and the method entails overflowing the cleaning solution from a first compartment to a second compartment and then overflowing the cleaning solution from the second compartment to a third compartment as the cleaning solution is pumped through the oil removing tank.

9. The method of claim 5 wherein cooling includes chilling a cooling solution and pumping the cooling solution through a coil network disposed uniformly throughout the oil removing tank and uniformly cooling the entire volume of cleaning solution contained within the oil removing tank.

10. The method of claim 9 wherein the oil removing tank includes a plurality of staged compartments and wherein the method including directing the cooling coil network uniformly throughout the oil removing tank.

11. The method of claim 5 wherein the step of cooling entails directing a cooling coil network through the oil removing tank and pumping a chilled cooling solution through the coil network so as to reduce the temperature of the cleaning solution uniformly throughout the volume of the oil removing tank, and wherein the method further includes splitting the cooling coil network into at least two units and feeding the two units independently from a chiller such that separate portions of the oil removing tank are cooled by separate cooling coil units.

* * * * *